(12) United States Patent
Mitsui (10) Patent No.: US 9,715,358 B2
(45) Date of Patent: Jul. 25, 2017

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/063,318

(22) Filed: Mar. 7, 2016

(65) Prior Publication Data

US 2016/0266855 A1 Sep. 15, 2016

(30) Foreign Application Priority Data

Mar. 9, 2015 (JP) .................................. 2015-046157

(51) Int. Cl.
*G06F 3/12* (2006.01)
*H04N 1/00* (2006.01)

(52) U.S. Cl.
CPC .......... *G06F 3/1255* (2013.01); *G06F 3/1204* (2013.01); *G06F 3/1285* (2013.01); *H04N 1/00411* (2013.01); *H04N 2201/0094* (2013.01)

(58) Field of Classification Search
CPC .... G06F 3/1204; G06F 3/1254; G06F 3/1255; G06F 3/1258; G06F 3/1284; H04N 1/00411; H04N 2201/0094
USPC ................. 358/1.15, 442, 1.13, 1.9; 709/223
See application file for complete search history.

(56) References Cited

U.S. PATENT DOCUMENTS

| 2004/0111418 A1* | 6/2004 | Nguyen ................ G06F 3/1205 |
| 2005/0210227 A1* | 9/2005 | Emerson ............... G06F 3/1205 713/1 |
| 2009/0290185 A1* | 11/2009 | Shiohara ............... G06F 3/1208 358/1.13 |
| 2010/0079778 A1* | 4/2010 | Kohama ............ H04N 1/00204 358/1.9 |
| 2010/0097654 A1* | 4/2010 | Takei .................... G06F 3/1257 358/1.16 |
| 2012/0013943 A1* | 1/2012 | Shibao ............... G06K 15/1806 358/1.15 |
| 2012/0218576 A1* | 8/2012 | Sekine .................. G06F 3/1247 358/1.13 |
| 2015/0324667 A1* | 11/2015 | Harada ................. G06F 3/1205 358/1.15 |
| 2017/0068494 A1* | 3/2017 | Fukuda ................. G06F 3/1257 |

FOREIGN PATENT DOCUMENTS

JP H07196232 A 8/1995

\* cited by examiner

*Primary Examiner* — Negussie Worku
(74) *Attorney, Agent, or Firm* — Canon U.S.A., Inc. IP Division (57) ABSTRACT

An information processing apparatus according to an embodiment of the present invention determines whether there is a setting value that belongs a target category and can be set in combination with another setting value and changes an input setting value that has been input via a print setting screen and has been determined not to be able to be set in combination with the other setting value to the setting value that can be set in combination with the other setting value on the basis of a result of the determination.

7 Claims, 9 Drawing Sheets

```
*Feature: PaperSize
{
    *ConflictPriority: 100
    *DefaultOption: A4
    *Option: A4
    *Option: A3
    *Option: LETTER
}
*Feature: Orientation
{
    *ConflictPriority: 200
    *DefaultOption: PORTRAIT
    *Option: PORTRAIT
    *Option: LANDSCAPE
}
*Feature: Stapling
{
    *ConflictPriority: 300
    *DefaultOption: NONE
    *Option: NONE
    *Option: TOP_LEFT
    *Option: BOTTOM_LEFT
    *Option: TOP_RIGHT
    *Option: BOTTOM_RIGHT
    *Option: DUAL_LEFT
    *Option: DUAL_RIGHT
    *Option: DUAL_TOP
    *Option: DUAL_BOTTOM
    *Option: SUDDLE_STITCH
}
*InvalidCombination: LIST(PaperSize.A3, Orientation.PORTRAIT, Stapling.DUAL_LEFT)
*InvalidCombination: LIST(PaperSize.A3, Orientation.PORTRAIT, Stapling.DUAL_RIGHT)
*InvalidCombination: LIST(PaperSize.A3, Orientation.LANDSCAPE, Stapling.DUAL_TOP)
*InvalidCombination: LIST(PaperSize.A3, Orientation.LANDSCAPE, Stapling.DUAL_BOTTOM)
```

LEFT SIDE (TWO POSITIONS)
RIGHT SIDE (TWO POSITIONS)
UPPER SIDE (TWO POSITIONS)
LOWER SIDE (TWO POSITIONS)

FIG. 10B

UPPER LEFT (ONE POSITION)
LOWER LEFT (ONE POSITION)
UPPER RIGHT (ONE POSITION)
LOWER RIGHT (ONE POSITION)

FIG. 11

```
*Feature: Stapling
{
    *ConflictPriority: 300
    *DefaultOption: NONE
    *Option: NONE
    {
    *Category: 0
    }
    *Option: TOP_LEFT
    {
    *Category: 1
    }
    ......
}
```

INFORMATION PROCESSING APPARATUS, INFORMATION PROCESSING METHOD, AND RECORDING MEDIUM

BACKGROUND OF THE INVENTION

Field of the Invention

The present invention relates to an information processing apparatus, an information processing method, and a recording medium.

Description of the Related Art

In recent years, the V4 printer driver that is a new architecture has been introduced in a computer OS. The V4 printer driver expresses an available print setting function in each model using a model-dependent file called PostScript Printer Description (PPD) or Generic Printer Description (GPD). Information about functions that cannot be set at the same time is included in a PPD or GPD as invalid combination information.

Setting change processing performed to cancel an invalid combination at the time of print setting is called rounding processing based on a constraint rule.

There are various methods of changing a print setting when an invalid combination is specified. Japanese Patent Laid-Open No. 7-196232 discloses a method of displaying an alert for a user to notify the user that print setting cannot be performed when an invalid combination is specified.

SUMMARY OF THE INVENTION

In a case where a user changes a print setting and an invalid combination included in a PPD or GPD is set, the V4 printer driver compulsorily changes the print setting to prevent the use of a function having the lowest priority. In a case where an invalid combination is specified at the time of print setting, a setting value can be set for a specific function on the basis of a single priority determined in advance.

However, in the method of notifying a user each time an invalid combination is specified, an alert is displayed many times in the case of a model having many complicated functions. This is annoying and it takes time to cancel the invalid state. In a method of automatically canceling an invalid combination, since a setting is compulsorily changed on the basis of a single priority determined in advance, the change in the setting is often performed without consideration for a user's desire and a function is often disabled. For example, in a case where a value that cannot be set for a stapling function is specified, the setting value of the stapling function may be compulsorily set to "no setting".

The present invention provides an information processing apparatus and an information processing method capable of bringing a print setting closer to a user's desire without imposing a burden on a user when an invalid combination is specified.

An information processing apparatus according to an embodiment of the present invention includes a first determination unit configured to determine whether an input setting value input via a print setting screen can be set in combination with another setting value, a second determination unit configured to, if the first determination unit determines that the input setting value cannot be set in combination with the other setting value, determine whether there is a setting value that belongs to a target category and can be set in combination with the other setting value, and a change unit configured to change the input setting value to the setting value that can be set in combination with the other setting value based on a result of determination performed by the first determination unit and a result of determination performed by the second determination unit. The second determination unit determines whether there is a setting value that belongs to the same category (a first category) as that of the input setting value and can be set in combination with the other setting value, and determines whether there is a setting value that belongs to a second category different from that of the input setting value and can be set in combination with the other setting value if the second determination unit determines that there is no setting value that belongs to the first category and can be set in combination with the other setting value.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

<First Embodiment>

Figure 1:
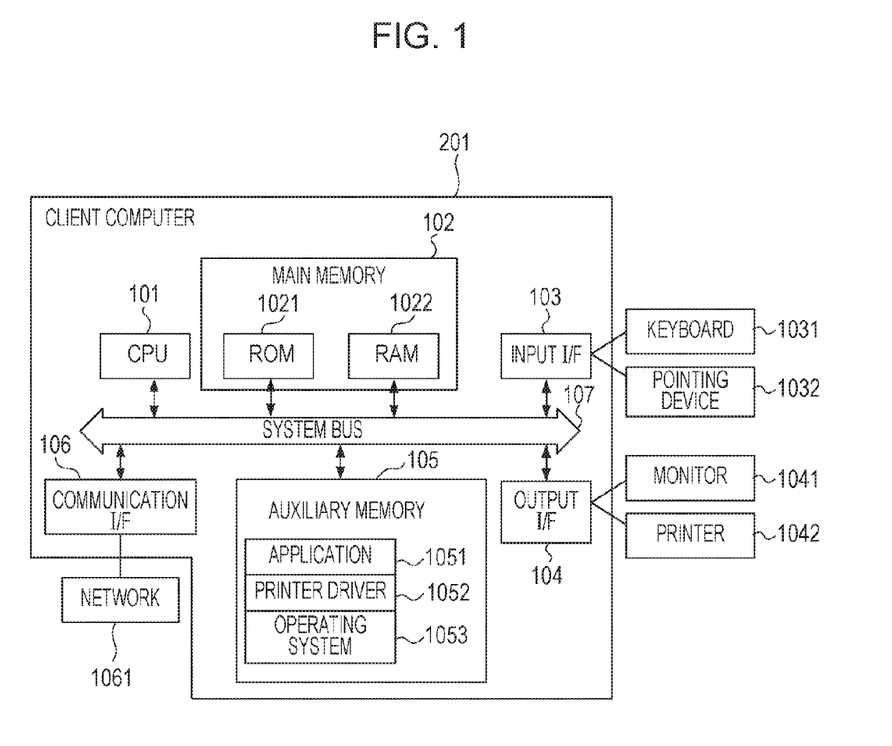
FIG. 1 is a diagram illustrating an exemplary hardware configuration of an information processing apparatus.
Figure 2:
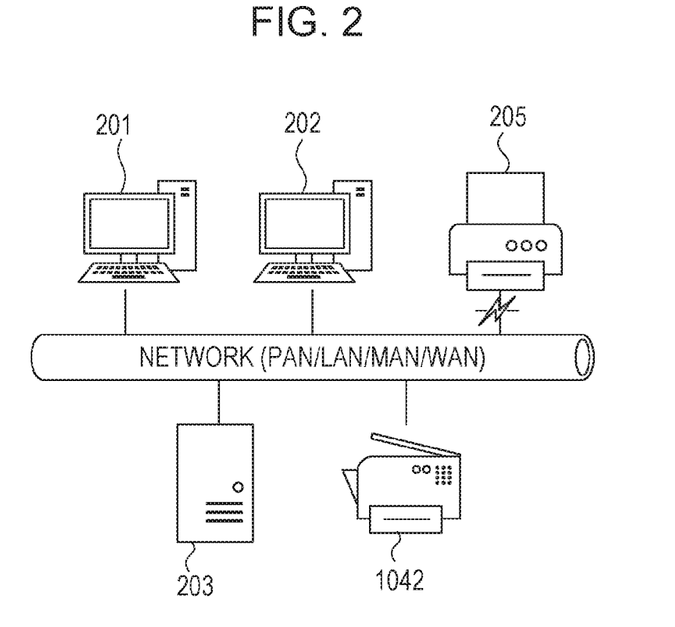
FIG. 2 is a diagram illustrating an exemplary configuration of a printing system.

FIG. 1 is a diagram illustrating an exemplary hardware configuration of an information processing apparatus (computer) according to this embodiment. In this embodiment, a client computer 201 to be described later with reference to FIG. 2 is a single information processing apparatus for performing processing according to this embodiment. However, a system including a plurality of apparatuses or a system including a plurality of apparatuses connected via a network may perform processing according to this embodiment.

The client computer 201 includes a CPU 101, a main memory 102, an input I/F 103, an output I/F 104, an auxiliary memory 105, and a communication I/F 106. The CPU 101, the main memory 102, the input I/F 103, the output I/F 104, the auxiliary memory 105, and the communication I/F 106 are interconnected via a system bus 107.

The CPU 101 performs overall control of the client computer 201 in accordance with a program stored in a Read-Only Memory (ROM) 1021, a Random Access Memory (RAM) 1022, which are included in the main memory 102, or the auxiliary memory 105. The RAM 1022 is used as a work area when the CPU 101 performs various pieces of processing. The auxiliary memory 105 stores programs for an application 1051, a printer driver 1052, and an operating system (OS) 1053.

The CPU 101 performs processing in accordance with a program stored in the main memory 102 or the auxiliary memory 105, so that the functions of the client computer 201 and processes, which are to be described later, are realized.

Input devices including a keyboard 1031 and a pointing device 1032 such as a mouse or a touch panel allow a user to input various instructions into the client computer 201 via the input I/F 103. The output I/F 104 is an interface for outputting data from the client computer 201, and outputs data to an output device such as a monitor 1041 or a printer 1042. The monitor 1041 is an example of a display unit in the client computer 201.

The client computer 201 is connected to the printer 1042 via a local I/O such as the output I/F 104, but may be connected to the printer 1042 via the communication I/F 106 and a network 1061. The system bus 107 exchanges data with an I/F or a module.

The printer 1042 may be a printer having only a print function, a fax apparatus having only a fax function, or a multifunction apparatus having a plurality of functions including a scan function and a print function. The printer 1042 is also called an image processing apparatus.

FIG. 2 is a diagram illustrating an exemplary configuration of a printing system according to this embodiment. A printing system includes the client computer 201, a printer 205, and the printer 1042. Apparatuses included in the printing system are connected to a network.

The client computer 201 is an information processing apparatus that creates a print target document and a print target image and is connected to a network. The client computer 201 is an information processing apparatus that performs processing according to this embodiment and has the hardware configuration illustrated in FIG. 1. The printing system may include a plurality of information processing apparatuses such as the client computers 201 and 202. In a case where the printing system includes the client computer 202, the hardware configuration of the client computer 202 is the same as that of the client computer 201.

The printing system may include a server computer 203 that manages a user such as the client computer 201 and a printer included in the printing system and is connected to a network.

The printer 205 is physically connected to a network, but is actually in an off-line state in which the printer 205 is unavailable. Therefore, the printing system does not necessarily have to include the printer 205. The printer 1042 is connected to a network and is in an available state.

The scale of a network is various. Examples of a network include a Personal Area Network (PAN), a Local Area Network (LAN), a Metropolitan Area Network (MAN), and a Wide Area Network (WAN).

Apparatuses included in the printing system may be interconnected using cloud service beyond the Internet. The client computer 201 is an apparatus connectable to, for example, a printer (image processing apparatus).

Figure 3:
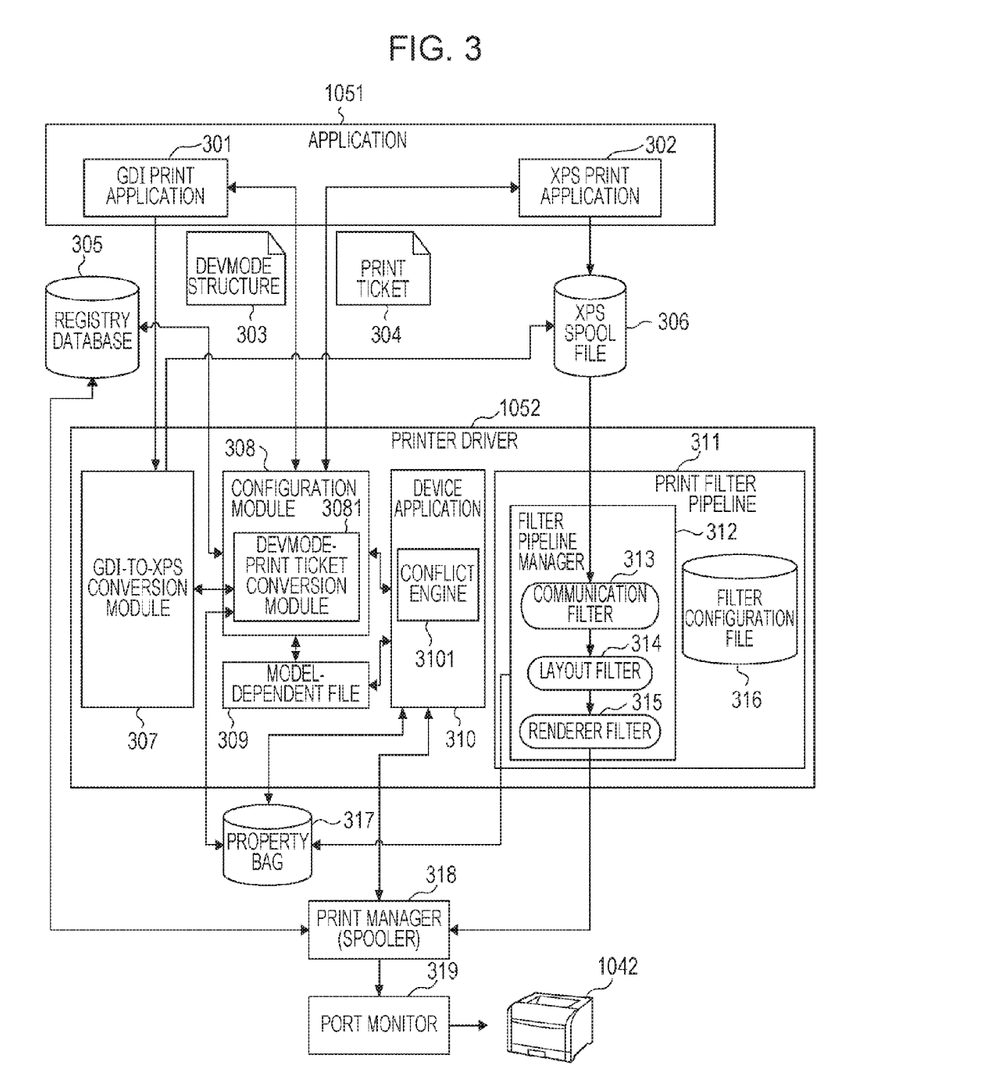
FIG. 3 is a diagram describing print processing performed with a V4 printer driver.

FIG. 3 is a diagram describing print processing performed with a V4 printer driver. In print processing performed with a V4 printer driver, a file format called Extensible Markup Language (XML) Paper Specification (hereinafter referred to as an XPS) is used as spool data and printing is performed.

The application 1051 that is a function of the client computer 201, the printer driver 1052, and a program for an operating system are stored in the auxiliary memory 105, are loaded into the RAM 1022, and is executed by the CPU 101. The application 1051 and the printer driver 1052 operate on the operating system. The printer driver 1052 is a V4 printer driver.

A print manager 318, a GDI-to-XPS conversion module 307, and a filter pipeline manager 312 are modules included in the operating system. The GDI-to-XPS conversion module 307 and the filter pipeline manager 312 are provided by the operating system and are included in the printer driver 1052 as dedicated modules.

Filters 313 to 315 of the filter pipeline manager 312 and a device application 310 are included in the printer driver 1052. The device application 310 is automatically installed into an information processing apparatus such as the client computer 201 via a network in synchronization with installation of the printer driver 1052 into the information processing apparatus.

A GDI print application 301 (hereinafter referred to as a GDI application 301) and an XPS print application 302 (hereinafter referred to as an XPS application 302) are included in the application 1051. The GDI application 301 is an application for performing printing using a Graphics Device Interface (GDI) prepared by the operating system. The XPS application 302 is an application for performing printing directly using an XPS spool file 306.

A user performs the following operations using input devices such as the keyboard 1031 and the pointing device 1032. That is, a user instructs the printer 1042 to perform print processing using the screen of the application 1051 such as the screen of the GDI application 301 or the screen of the XPS application 302 displayed on the monitor 1041. The print processing is realized by sequentially performing three pieces of processing, "the selection of a printer", "the generation of print setting data", and "the conversion of drawing data". The flow of the print processing will be described below.

First, the application 1051 selects the printer 1042 to be used for printing on the basis of a user's operation performed via the screen of the application 1051. The application 1051 selects the printer 1042 by selecting the printer driver 1052 corresponding to the printer 1042 on the basis of a user's operation performed via the screen of the application 1051.

Next, the generation of print setting data will be described. The print setting data is data including setting values of respective functions regarding the print processing, and is used for the print processing. At the time of the generation of print setting data, the application 1051 reserves a memory region for the print setting data in the RAM 1022. The application 1051 generates the print setting data using a configuration module 308 in the printer driver 1052 and stores the generated print setting data in the reserved region in the RAM 1022.

The GDI application 301 uses a binary DEVMODE structure 303 as the print setting data. The XPS application 302 uses a print ticket 304 written in the eXtensive Markup Language (XML), which is a markup language, as the print setting data. The DEVMODE structure 303 has a standard area defined by the operating system, and an extended area uniquely defined by the printer driver. The print ticket 304 is print setting data written in the XML format, in which a standard area and an extended area are described separately by namespace.

Since the print setting data also includes information unique to a machine model, the configuration module 308 generates the print setting data using a model-dependent file 309. The application 1051 changes print setting by rewriting the contents of the DEVMODE structure 303 or the print ticket 304. The print setting data including setting values required for printing such as information about a sheet size to be output (for example, "A4"), a selection of double-sided printing, a selection of color printing or monochrome printing, and a selection of a sheet feed stage.

In a case where the print setting data is represented by the DEVMODE structure 303, the specification of the standard area of the print setting data is published. The GDI application 301 therefore directly changes the contents of the standard area. The specification of the extended area of the print setting data dependent on the printer 1042 is known only by the printer driver 1052. The device application 310 therefore changes the contents of the extended area of the print setting data on the basis of a user's operation performed via a user interface.

In a case where the print setting data is represented by the print ticket 304, the setting values are written in the XML format. The XPS application 302 can therefore directly change all of the setting values. However, the extended area of the print setting data is uniquely defined for each printer driver. The detailed specification of the extended area varies from the printer 1042 to the printer 1042 and is not known by the XPS application 302. The device application 310 therefore changes the setting values of the extended area of the print setting data on the basis of a user's operation performed via a user interface.

The device application 310 is included in the printer driver 1052, but is installed as a separate program from the printer driver 1052. The device application 310 exchanges print setting data with the printer driver 1052 using the print ticket 304. The device application 310 includes a conflict engine 3101. In a case where the invalid combination of setting values of respective functions is set in the print setting data, the conflict engine 3101 generates print setting data in which the valid combination of setting values is set.

Since information about the invalid combination of setting values of respective functions in the print setting data is written in the model-dependent file 309, the conflict engine 3101 reads the model-dependent file 309 before displaying a user interface. The information about the invalid combination of setting values written in the model-dependent file 309 is hereinafter referred to as constraint rule information. The combination of setting values that is represented by the constraint rule information is an invalid combination prohibited from being set. The combination of setting values that is not represented by the constraint rule information is a permitted combination. The printer driver 1052 changes the setting dependent on the printer 1042 which is represented by the DEVMODE structure 303 or the print ticket 304 on the basis of a user's operation performed via a user interface. Since the print setting data is required for each piece of print processing, the application 1051 generates the print setting data each time printing is performed. The printer driver 1052 stores an optional device of the printer 1042 and an environmental setting for each user in a registry database 305 or a property bag 317. The print manager 318 of the operating system stores default values of the print setting data in the registry database 305. The registry database 305 and the property bag 317 are stored in the auxiliary memory 105.

Finally, drawing data conversion processing will be described. After the print setting data has been determined, the application 1051 instructs the printer 1042 to perform print processing on the basis of a user's operation performed via a user interface.

In a case where the application 1051 issues an instruction for print processing using the GDI application 301, the application 1051 transmits drawing data to the GDI-to-XPS conversion module 307. The GDI-to-XPS conversion module 307 creates the XPS spool file 306. At the time of creation of the XPS spool file 306, the GDI-to-XPS conversion module 307 calls up the configuration module 308 and converts the print setting data from the DEVMODE structure 303 to the print ticket 304. The GDI-to-XPS conversion module 307 uses a DEVMODE-print ticket conversion module 3081 for conversion of the print setting data. Since the DEVMODE-print ticket conversion module 3081 can read/write information from/into the property bag 317, the DEVMODE-print ticket conversion module 3081 can refer to data stored by the device application 310 and convert the print setting data.

In a case where the application 1051 issues an instruction for print processing using the XPS application 302, there are two methods of creating the XPS spool file 306. The first method is that the XPS application 302 itself creates the XPS spool file 306. The second method is that the operating system generates the XPS spool file 306 in response to a drawing instruction from the XPS application 302.

In both cases where the application 1051 issues an instruction for print processing using the GDI application 301 and where the application 1051 issues an instruction for print processing using the XPS application 302, the XPS spool file 306 is created in the middle of the print processing. Thus, the print processing performed with the V4 printer driver is characterized in that the XPS spool file 306 based on drawing data is always generated at the time of printing.

A print filter pipeline 311 acquires the created XPS spool file 306 and performs the following processing. The print filter pipeline 311 performs print processing using a plurality of filters. A filter configuration file 316 controls the number of filters included in the print filter pipeline 311 and the order of processing of filters. The filter pipeline manager 312 operates in the print filter pipeline 311. The filter pipeline manager 312 causes the communication filter 313, the layout filter 314, and the renderer filter 315 to perform processing in this order in accordance with the filter configuration file 316.

The number and types of the filters included in the print filter pipeline 311 vary depending on the configuration of the printer driver 1052. For example, the print filter pipeline 311 may include an encryption filter for encrypting a print job in addition to three filters, the communication filter 313, the layout filter 314, and the renderer filter 315.

The printing processing is performed by transferring the XPS spool file 306 to the filters in the print filter pipeline 311. Each of these filters processes the XPS spool file 306 and transfers the processed file to the subsequent filter, so that the processing proceeds. Through the pieces of processing of these filters, the XPS spool file 306 is converted into a print job and is transmitted to the printer 1042. The printer 1042 capable of interpreting the print job performs the printing processing based on the print job by interpreting the print job.

Each of the filters included in the print filter pipeline 311 can store its unique data in the property bag 317, and can acquire information about the operating system and data of another filter from the property bag 317.

The communication filter 313 acquires information necessary for printing from the printer 1042 and stores the acquired information in the property bag 317. The layout filter 314 performs processing relating to a layout, such as scaling, an imposition layout in bookbinding, and stamping. The layout filter 314 performs processing in accordance with the print ticket 304 included in the XPS spool file 306. The layout filter 314 performs processing in accordance with the print ticket 304 included in the XPS spool file 306. Therefore, for example, in a case where the setting of imposition is not present in the print ticket 304, the layout filter 314 transfers the XPS spool file 306 to the subsequent filter without performing any processing.

The renderer filter 315 renders the received XPS spool file 306 to convert it into data written in a page description language (hereinafter referred to as a PDL). Furthermore, the renderer filter 315 converts the setting of the standard area of the print setting data in the print ticket 304 into data written in a printer job language (hereinafter referred to as a PJL). In a case where there is the subsequent filter, the renderer filter 315 collectively transfers the PDL data and the PJL data to the subsequent filter as a print job in the form of stream data. In a case where the subsequent filter is not present, the renderer filter 315 collectively transfers the PDL data and the PJL data to the filter pipeline manager 312 as a print job.

The filter pipeline manager 312 transmits the received print job to the print manager 318 for managing the schedule of the print processing. The print manager 318 registers received print jobs in a queue (a waiting line) one after another. The print manager 318 communicates with the printer 1042 and transmits the print jobs to the printer 1042 via a port monitor 319 in the order in which the print jobs have been registered in the queue when the printer 1042 becomes ready for printing.

Thus, the main role of the printer driver 1052 is the conversion of drawing data and print setting data into a print job. The client computer 201 transmits a print job converted by the printer driver 1052 to the printer 1042 to instruct the printer 1042 to perform print processing.

In this embodiment, print processing performed with a printer driver has been described. However, an embodiment of the present invention can also be applied to another piece of processing such as FAX transmission processing. In the case of FAX transmission processing, the printer driver 1052 includes a FAX filter for generating FAX data instead of the renderer filter 315 and operates as a FAX driver for transmitting the FAX data to a FAX machine.

Figure 4:
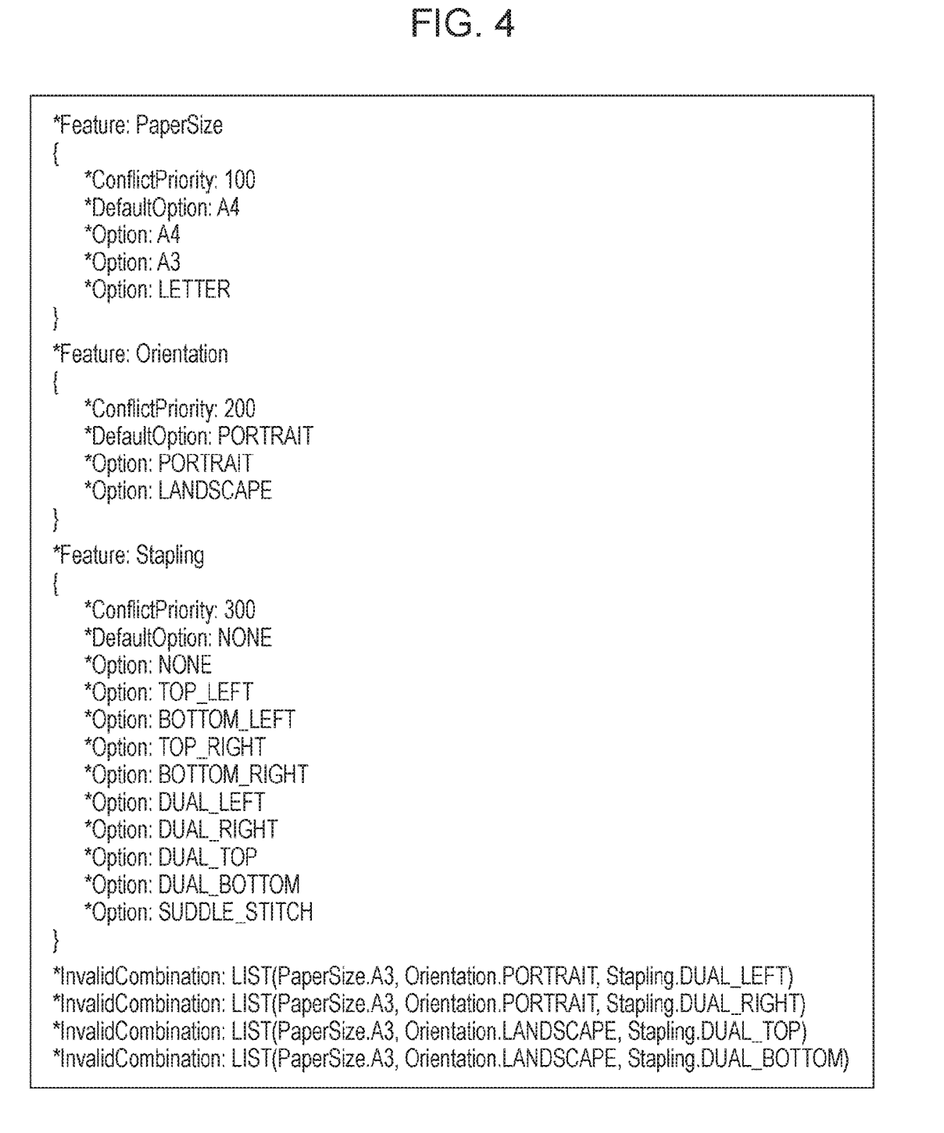
FIG. 4 is a diagram illustrating a sample of a model-dependent file.

FIG. 4 is a diagram illustrating a sample of the model-dependent file 309. Referring to FIG. 4, a GPD that is an example of the model-dependent file 309 is illustrated. The model-dependent file 309 includes the definitions of functions (Feature) included in the print setting data and constraint rule information. These functions can be named. In this example in FIG. 4, a sheet size function, a print orientation function, and a stapling function are named PaperSize, Orientation, Stapling, respectively. The model-dependent file 309 is an example of a file that defines the setting values of a plurality of setting value candidates. The stapling function is an example of a binding position specification function in print setting.

For each function defined in the model-dependent file 309, setting value candidates (Option) are defined. One of the setting value candidates is selected, so that the setting value of the function is determined in the print setting data. For each function defined in the model-dependent file 309, a setting value candidate set in an initial state can be defined as a default value (DefaultOption). In a state where the client computer 201 does not perform processing after reading the model-dependent file 309, the setting value of each function in the print setting data is a default value.

For each function defined in the model-dependent file 309, a priority (ConflictPriority in the example in FIG. 4) is set. The smaller the value of priority, the higher the priority of a function. The larger the value of priority, the lower the priority of a function.

In a case where the combination of setting values set for functions in the print setting data defined in the model-dependent file 309 is an invalid combination, the device application 310 rounds the setting value of a function with a low priority to the setting value of another setting value candidate. The constraint rule information is defined in the model-dependent file 309 as a list of a plurality of combinations of a function and a setting value candidate (for example, the combination of PaperSize and A3). In a case where the combination of setting values of functions in print setting data is the same as the combination defined in the list, the combination is an invalid combination.

When the device application 310 determines print setting data in accordance with a user's operation performed via a user interface, the device application 310 cancels an invalid combination of setting values on the basis of a specified category. This cancellation processing will be described.

Figure 5:
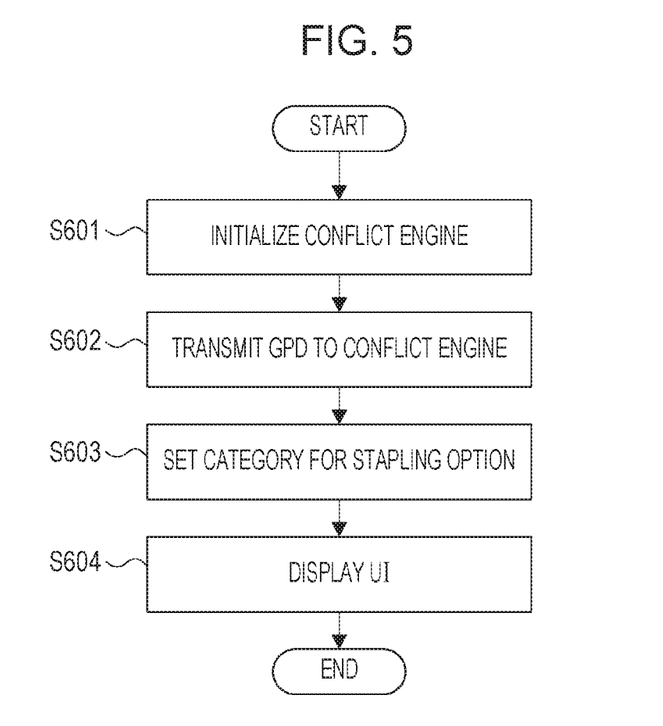
FIG. 5 is a flowchart illustrating an exemplary user interface display process performed by a V4 printer driver.

FIG. 5 is a flowchart illustrating an exemplary user interface display process. This process is realized by loading a program for the device application 310 into the RAM 1022 and causing the CPU 101 to execute the program.

In S601, the device application 310 initializes the conflict engine 3101 that is a module used to cancel an invalid combination in print setting data.

In S602, the device application 310 transfers the model-dependent file 309 such as a GPD to the conflict engine 3101. The conflict engine 3101 acquires functions of a model and constraint rule information from the model-dependent file 309 and stores them in a database in the auxiliary memory 105. In this embodiment, the model-dependent file 309 is a GPD described above with reference to FIG. 4.

In S603, the device application 310 sets a category for each of all setting value candidates of a stapling function in the print setting data using the conflict engine 3101. A category represents a classification group of setting value candidates and is represented by a value. Setting value candidates having the same category value belong to the same group.

In table A, categories are set for all setting value candidates (Option) defined for a stapling function. In this embodiment, the device application 310 sets a category 0 for "no setting value", a category 1 for a one-position binding group, a category 2 for a two-position binding group, and a category 3 for "saddle stitch".

Figure 6:
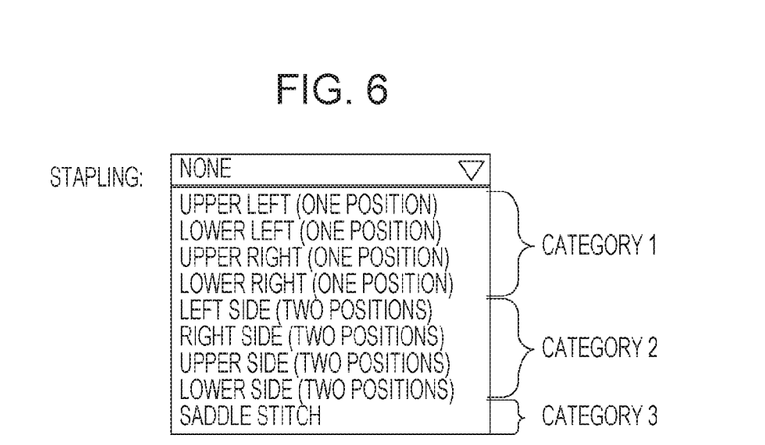
FIG. 6 is a diagram illustrating an exemplary result of category setting.

On a user interface for the device application 310, setting value candidates defined for the stapling function are displayed as illustrated in FIG. 6. Braces and category names ("category 1", "category 2", and "category 3") on the right side of the braces in FIG. 6 are not displayed. For each setting value candidate, the representation of a brace and a category name (for example, "category 1") illustrated in FIG. 6 is instructed.

After the process from S601 to S603 has been completed, the device application 310 determines that the initialization of the conflict engine 3101 has been completed and displays the screen of the user interface for the device application 310 on, for example, the monitor 1041 in S604. The screen of the user interface for the device application 310 is an example of a print setting screen.

Figure 7:
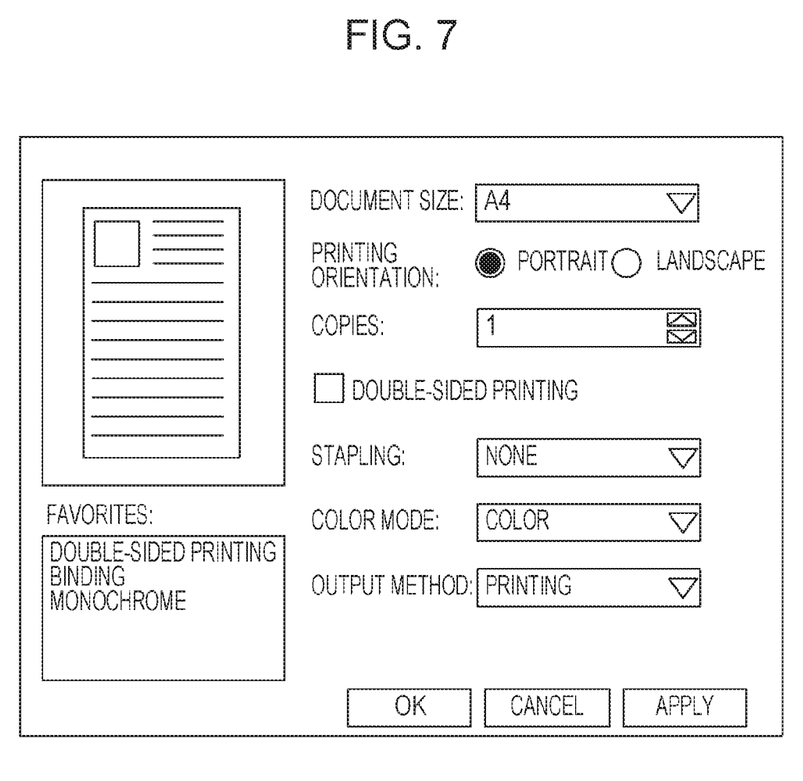
FIG. 7 is a diagram illustrating an example of a user interface screen.

FIG. 7 is a diagram illustrating a display example of a user interface screen for the device application 310. Clicking a setting area (a rectangular portion where "none" is displayed) for the item of "stapling" on the screen illustrated in FIG. 7 with, for example, the pointing device 1032 displays the list of setting value candidates of the stapling function illustrated in FIG. 6 in the setting area for the item of "stapling". The device application 310 is brought into a standby state to wait for a user's input for the change of print setting.

TABLE A

| Option | Category |
|---|---|
| NONE | 0 |
| TOP_LEFT | 1 |
| BOTTOM_LEFT | 1 |
| TOP_RIGHT | 1 |
| BOTTOM_RIGHT | 1 |
| DUAL_LEFT | 2 |
| DUAL_RIGHT | 2 |
| DUAL_TOP | 2 |
| DUAL_BOTTOM | 2 |
| SUDDLE_STITCH | 3 |

Figure 8:
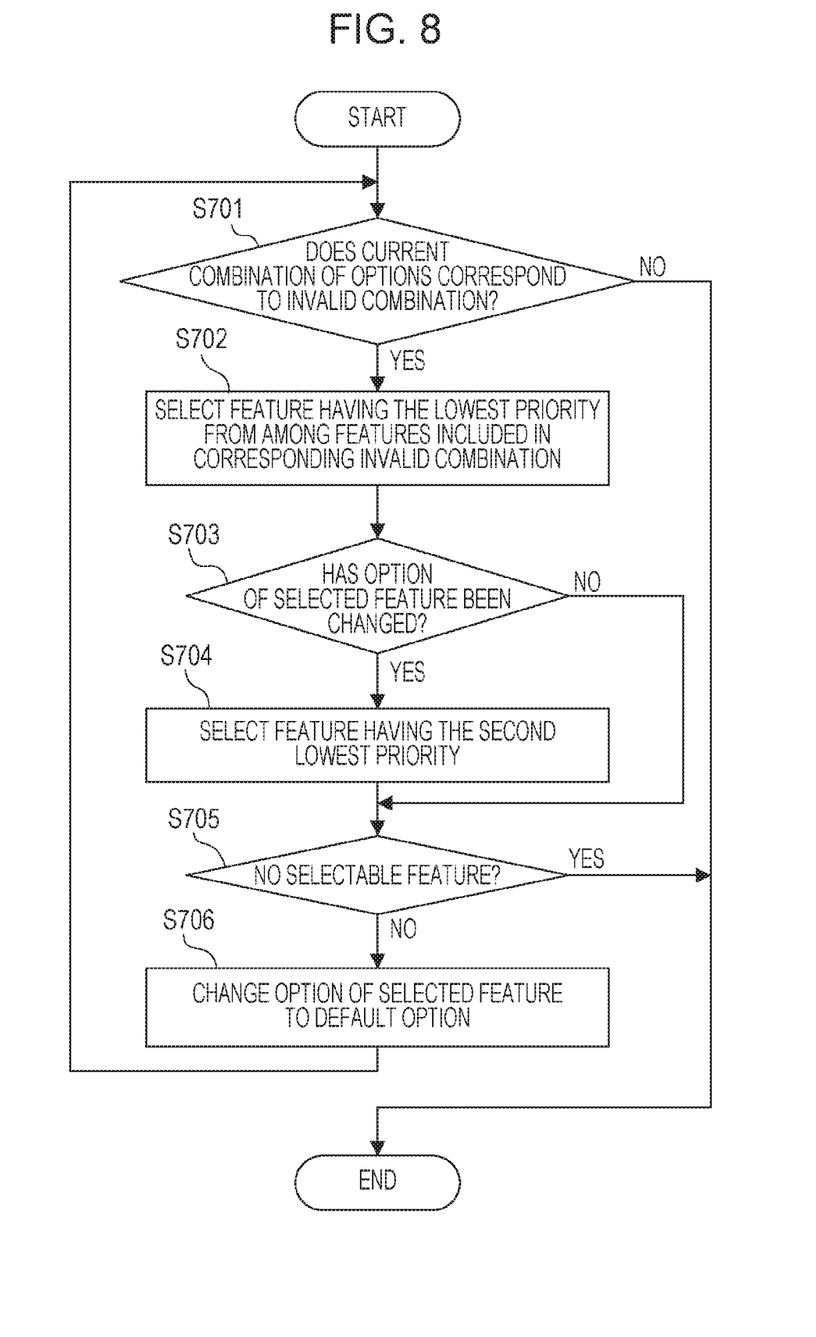
FIG. 8 is a flowchart illustrating an exemplary rounding process based on a constraint rule in the related art.

FIG. 8 is a flowchart illustrating an exemplary rounding process based on a constraint rule in the related art. In a case where there is an invalid combination of setting values of functions in print setting data, the conflict engine 3101 cancels the invalid combination.

In S701, the conflict engine 3101 determines whether the current combination of setting values of functions in print setting data is the same as one of combinations represented by constraint rule information written in a GPD.

More specifically, the conflict engine 3101 acquires the constraint rule information from the GPD, and acquires information about current setting values set for functions from current print setting data represented by the DEVMODE structure 303 or the print ticket 304. The conflict engine 3101 determines whether there is a coincidence between the setting value of each function in the print setting data and the setting value of a corresponding function included in a list in constraint rule information. In a case where the conflict engine 3101 determines that there is a coincidence between the setting value of each function in the print setting data and the setting value of a corresponding function included in the list in the constraint rule information, the conflict engine 3101 determines that the current combination of functions in the print setting data corresponds to one of combinations represented by the constraint rule information.

In a case where the conflict engine 3101 determines that the current combination of setting values of all functions in the print setting data is the same as one of combinations represented by the constraint rule information written in the GPD, the process proceeds to S702.

In a case where the conflict engine 3101 determines in S701 that the current combination of setting values of all functions in the print setting data is not the same as all of combinations represented by the constraint rule information written in the GPD, the process illustrated in FIG. 8 ends. That is, the conflict engine 3101 determines that the invalid combination of functions in the print setting data has been canceled, and the process illustrated in FIG. 8 ends.

In S702, the conflict engine 3101 selects one of all functions in the print setting data having the lowest priority as a function to be subjected to rounding processing based on a constraint rule (hereinafter also referred to as rounding processing target function). The setting value of the selected function is an example of a setting value prohibited to be set in relation to the other functions.

In S703, the conflict engine 3101 determines whether the setting value of the rounding processing target function selected in S702 or S704 has already been subjected to the rounding processing based on a constraint rule. The processing of S703 is performed to prevent the process from being trapped in an endless loop in a case where a different invalid combination is generated again after the rounding processing based on a constraint rule has been performed upon the function selected in S702.

In a case where the conflict engine 3101 determines that the setting value of the rounding processing target function selected in S702 or S704 has already been subjected to the rounding processing based on a constraint rule, the process proceeds to S704. In a case where the conflict engine 3101 determines that the setting value of the rounding processing target function selected in S702 or S704 has yet to be subjected to the rounding processing based on a constraint rule, the process proceeds to S705.

In S704, the conflict engine 3101 selects one of all functions in the print setting data which has a priority higher by one than that of the current rounding processing target function as a function to be subjected to the rounding processing based on a constraint rule.

In S705, the conflict engine 3101 determines whether the selection of a function has been successfully performed in S704. In a case where the conflict engine 3101 determines that the selection of a function has been successfully performed in S704, the process proceeds to S706.

In a case where the conflict engine 3101 determines in S705 that the selection of a function has not been successfully performed in S704, the process illustrated in FIG. 8 ends. That is, the conflict engine 3101 determines that the cancellation of the invalid combination has failed, and the process illustrated in FIG. 8 ends without being trapped into an endless loop. The reason why a result of the determination processing in S705 is YES is that there is a contradiction in the invalid combination of functions written in a GPD that is the model-dependent file 309. By causing the conflict engine 3101 to resolve the contradiction in the invalid combination of functions written in the GPD, it is not determined that the selection of a function has not been successfully performed in S704.

In S706, the conflict engine 3101 performs rounding of a value by changing the setting value of the rounding processing target function to a default value. The reason why the setting value of the rounding processing target function is changed to a default value is that the default value, which is an initial value, is a setting value candidate that is least likely to be included in the invalid combination. After changing the setting value of the rounding processing target function to a default value in S706, the conflict engine 3101 repeats the process from S701.

The cancellation of an invalid combination achieved by the rounding processing based on a constraint rule in FIG. 8 will be described using tables B and C. Here, it is assumed that the conflict engine 3101 reads a GPD and operates.

It is assumed that there are three functions defined in the GPD, PaperSize representing a sheet size, Orientation representing a sheet orientation, and Stapling. It is further assumed that constraint rule information defined in the GPD includes the combination of "PaperSize.A3, Orientation.PORTRAIT, Stapling.DUAL_LEFT". The constraint rule information in the GPD indicates that it is impossible to perform double stapling on a left long side of an A3 portrait sheet.

Setting values set for respective functions in print setting data are as represented by table B. The conflict engine 3101 compares the constraint rule information in the GPD and the current combination of setting values of respective functions in the print setting data with each other. Referring to table B, the setting values of A3, PORTRAIT, and DUAL_LEFT are set for the functions of PaperSize, Orientation, and Stapling, respectively. The conflict engine 3101 therefore determines that the current combination of setting values of respective functions in the print setting data is the same as one of combinations represented by the constraint rule information in the GPD and is an invalid combination.

Subsequently, the conflict engine 3101 selects a function having the lowest priority from among functions included in the combination represented by the constraint rule information in the GPD which is the same as the current combination of functions in the print setting data. In this embodiment, the conflict engine 3101 selects the function of Stapling having the lowest priority among the functions of PaperSize, Orientation, and Stapling.

TABLE B

| Feature | Priority | Option |
| --- | --- | --- |
| PaperSize | 100 | A3 |
| Orienation | 200 | Portrait |
| Stapling | 300 | DUAL_LEFT |

The conflict engine 3101 changes the setting value of the stapling function in the print setting data to NONE that is a default value. Table C indicates a result of the change. The combination of setting values of functions in table C is not included in the constraint rule information in the GPD. This means that the conflict engine 3101 has canceled the invalid combination.

TABLE C

| Feature | Priority | Option |
| --- | --- | --- |
| PaperSize | 100 | A3 |
| Orienation | 200 | Portrait |
| Stapling | 300 | NONE |

Figure 9:
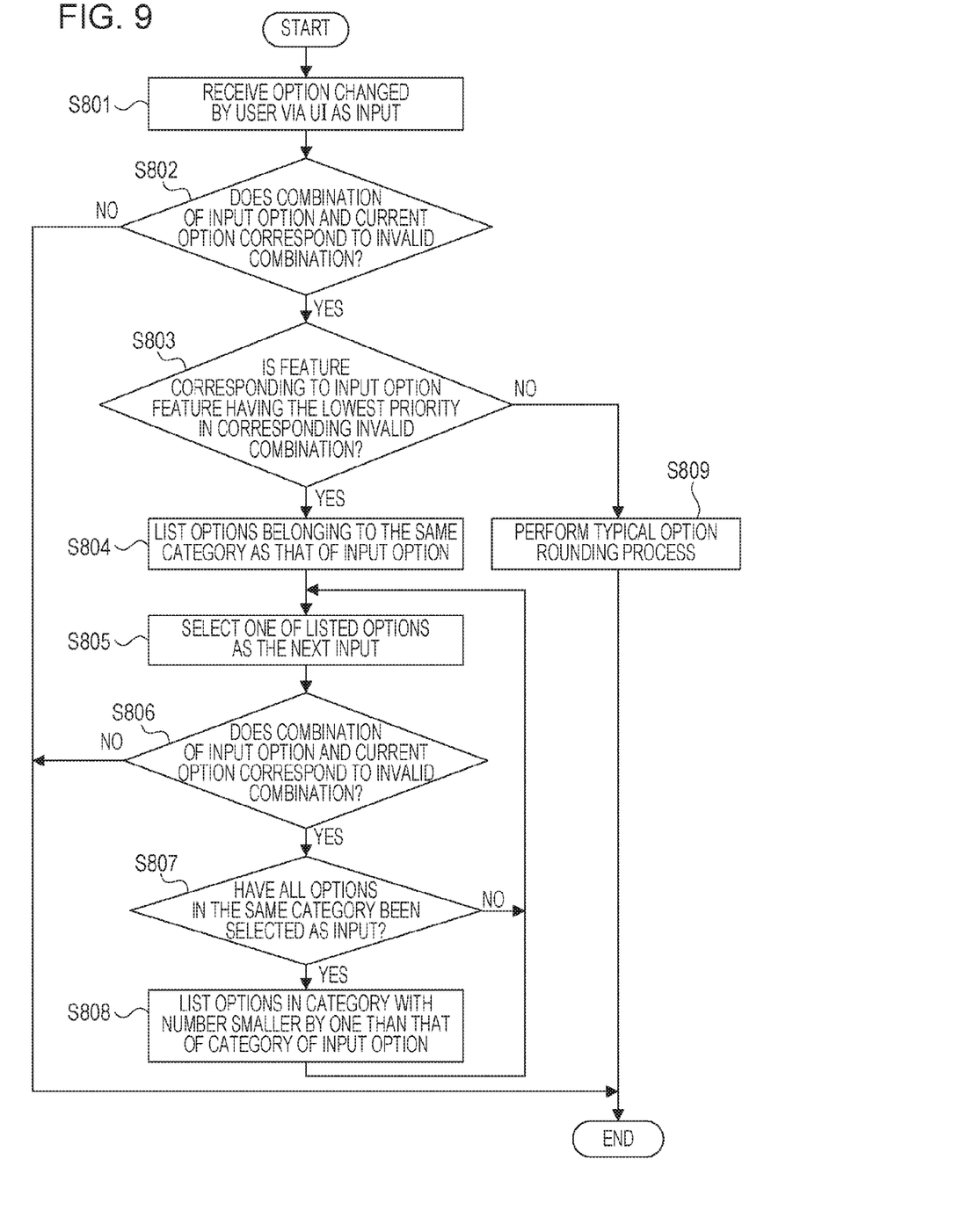
FIG. 9 is a flowchart illustrating an exemplary rounding process based on a constraint rule in which categories are used.

FIG. 9 is a flowchart illustrating an exemplary rounding process based on a constraint rule in which categories are used. In S801, on the basis of a user's operation performed via a user interface such as a print setting screen displayed on the monitor 1041, the conflict engine 3101 selects a setting value candidate to be set for a function in print setting data to input the selected setting value candidate.

In S802, the conflict engine 3101 determines whether the combination of the setting value of the setting value candidate input in S801 and another print setting value is the same as one of combinations represented by constraint rule information in a GPD. In a case where the conflict engine 3101 determines that the combination of the setting value of the setting value candidate input in S801 and another print setting value is the same as one of combinations represented by the constraint rule information in the GPD, the process proceeds to S803. In a case where the conflict engine 3101 determines that the combination of the setting value of the setting value candidate input in S801 and another print setting value is not the same as all of combinations represented by the constraint rule information in the GPD, the process illustrated in FIG. 9 ends.

In S803, the conflict engine 3101 determines whether, in one of combinations represented by the constraint rule information in the GPD which has been determined in S802 to be the same as the combination of the setting value of the input setting value candidate and another print setting value, a function relating to the input setting value candidate has the lowest priority. In a case where the conflict engine 3101 determines that the function relating to the input setting value candidate has the lowest priority, the process proceeds to S804. In a case where the conflict engine 3101 determines that the function relating to the input setting value candidate does not have the lowest priority, the process proceeds to S809.

Figure 10A:
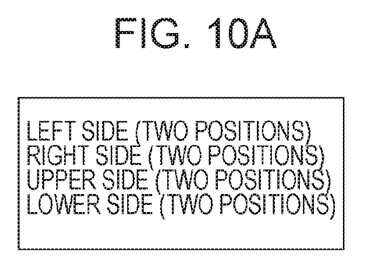
FIGS. 10A and 10B are diagrams each illustrating an example of a list of options.

In S804, the conflict engine 3101 selects setting value candidates having the same category number as the input setting value candidate from among setting value candidates of the function relating to the input setting value candidate in the GPD and lists all of them. FIG. 10A is a diagram illustrating exemplary listed setting value candidates.

In S805, the conflict engine 3101 selects one of the setting value candidates listed in S804 to input the selected setting value candidate. More specifically, the conflict engine 3101 selects, as a new input, one of the setting value candidates listed in S804 which is located at the uppermost position among the listed setting value candidates excluding a setting value candidate that has already been selected as an input.

In S806, the conflict engine 3101 determines whether the combination of the setting value of the setting value candidate input in S805 and the setting value of another function is the same as one of the combinations represented by the constraint rule information in the GPD. In a case where the conflict engine 3101 determines that the combination of the setting value of the setting value candidate input in S805 and the setting value of another function is the same as one of the combinations represented by the constraint rule information in the GPD, the process proceeds to S807. In a case where the conflict engine 3101 determines that the combination of the setting value of the setting value candidate input in S805 and the setting value of another function is not the same as all of the combinations represented by the constraint rule information in the GPD, the process illustrated in FIG. 9 ends.

In S807, the conflict engine 3101 determines whether all of the setting value candidates in the same category listed in S804 or S808 have been selected as an input. In a case where the conflict engine 3101 determines that all of the setting value candidates in the same category listed in S804 or S808 have not been selected as an input, the process proceeds to S805. In a case where the conflict engine 3101 determines that all of the setting value candidates in the same category listed in S804 or S808 have been selected as an input, the process proceeds to S808.

Figure 10B:
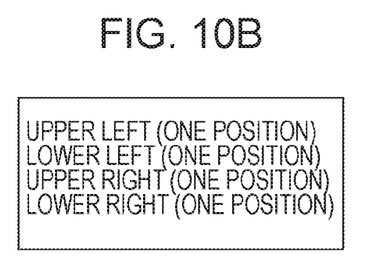

In S808, the conflict engine 3101 selects setting value candidates having a category number smaller by one than that of the input setting value candidate from among setting value candidates of the function relating to the input setting value candidate in the GPD and lists all of them. FIG. 10B is a diagram illustrating exemplary listed setting value candidates.

In this embodiment, a category number represents a priority among categories. The processing of S603 is therefore processing for setting a priority for each category. The larger the number of a category, the higher the priority of the category. The smaller the number of a category, the lower the priority of the category.

For example, it is assumed that there are setting value candidates in categories 0, 1, 2, and 3 and the conflict engine 3101 performs rounding processing based on a constraint rule upon the setting value of the setting value candidate in the category 2. In this case, first, the conflict engine 3101 searches setting value candidate in the category 2 for a target setting value candidate to be set, and performs the following processing in a case where the target setting value candidate has not been retrieved. That is, the conflict engine 3101 searches setting value candidates not in the category 3 or 0 but in the category 1 the number (priority) of which is smaller by one than that of the category 2 for the target setting value candidate. Subsequently, the conflict engine 3101 searches setting value candidates in the category 1 for the target setting value candidate. In a case where the target setting value candidate has not been retrieved, the conflict engine 3101 searches setting value candidates in the category 0 for the target setting value candidate.

In S809, the conflict engine 3101 performs the process illustrated in FIG. 8 that is a typical rounding processing based on a constraint rule.

In the process illustrated in FIG. 9, the conflict engine 3101 preferentially sets a setting value candidate in the same category as that of an input setting value candidate to cancel an invalid combination and brings a print setting closer to a user's desire. After the process illustrated in FIG. 9, the client computer 201 displays a setting value rounded in the process illustrated in FIG. 9 on a user interface such as a print setting screen displayed on the monitor 1041. For example, in a case where the client computer 201 displays the print setting screen illustrated in FIG. 7 on the monitor 1041, the permitted combination of setting values of functions such as "sheet size" and "stapling" is displayed on the print setting screen after the process illustrated in FIG. 9.

The cancellation of an invalid combination through the process illustrated in FIG. 9 will be described using tables A, B, and D.

It is assumed that there are three functions defined in a GPD, PaperSize representing a sheet size, Orientation representing a sheet orientation, and Stapling. Furthermore, it is assumed that, in constraint rule information defined in the GPD, the combination of "PaperSize.A3 , Orientation.PORTRAIT, Stapling.DUAL_LEFT" is written. The constraint rule information in the GPD indicates that it is impossible to perform double stapling on a left long side of an A3 portrait sheet.

Setting values set for respective functions in print setting data are as represented by table B. The conflict engine 3101 compares the combination of setting values written in the constraint rule information in the GPD and the current combination of setting values of respective functions in print setting data with each other. The setting values of functions, PaperSize, Orientation, and Stapling, represented by table B are A3, PORTRAIT, and DUAL_LEFT, respectively. The conflict engine 3101 therefore determines that the current combination of setting values of respective functions in the print setting data is the same as one of combinations represented by the constraint rule information in the GPD and is an invalid combination.

The conflict engine 3101 selects a function having the lowest priority from among functions included in the combination represented by the constraint rule information in the GPD which is the same as the current combination of functions in the print setting data. In this embodiment, the conflict engine 3101 selects Stapling having the lowest priority among PaperSize, Orientation, and Stapling.

Subsequently, the conflict engine 3101 acquires setting value candidates in the same category as that of DUAL_LEFT set for Stapling in the print setting data. All setting value candidates defined for the stapling function are as represented by table A. As setting value candidates belonging to the same category as that of DUAL_LEFT, the conflict engine 3101 acquires the setting value candidates of DUAL_TOP, DUAL_RIGHT, and DUAL_BOTTOM. The conflict engine 3101 lists DUAL_TOP, DUAL_RIGHT, DUAL_BOTTOM in this order.

The conflict engine 3101 selects DUAL_TOP located at the uppermost position among the listed setting value candidates as a setting value candidate to be set for Stapling in the print setting data. The conflict engine 3101 determines that the combination of A3 (PaperSize), PORTRAIT (Orientation), and DUAL_TOP (Stapling) is not the same as all of the combinations represented by the constraint rule information in the GPD, that is, determines that the combination of A3 (PaperSize), PORTRAIT (Orientation), and DUAL_TOP (Stapling) is not an invalid combination. The conflict engine 3101 sets DUAL_TOP for Stapling in the print setting data, and the process ends. The changed setting values set for respective functions in the print setting data are as represented by table D.

TABLE D

| Feature | Priority | Option |
| --- | --- | --- |
| PaperSize | 100 | A3 |
| Orienation | 200 | Portrait |
| Stapling | 300 | DUAL_TOP |

According to this embodiment, an information processing apparatus such as the client computer 201 can bring a print setting closer to a user's desire without imposing a burden on a user when an invalid combination is specified.

<Second Embodiment>

In the first embodiment, the device application 310 determines the category of a setting value candidate by specifying a category number for the conflict engine 3101. The device application 310 therefore needs to acquire information about the category of a setting value candidate of each function in print setting data in advance.

Figure 11:
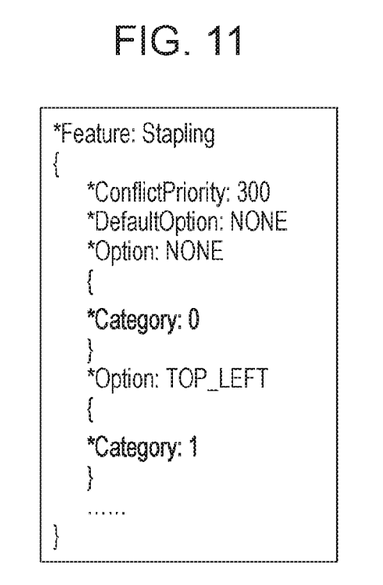
FIG. 11 is a diagram illustrating a model-dependent file for a V4 printer driver in which a category is set for each option.

However, in this embodiment, a GPD that is the model-dependent file 309 includes a category setting item as a setting item dependent on the definition of a setting value candidate as illustrated in FIG. 11. That is, the model-dependent file 309 also includes information about the category of a setting value candidate. In this embodiment, an information processing apparatus such as the client computer 201 acquires information about each setting value candidate and information about the category of each setting value candidate and classifies the setting value candidates into a plurality of categories.

According to this embodiment, since category information is included in the model-dependent file 309, an information processing apparatus such as the client computer 201 can set the setting value candidate of each function in print setting data for different categories in accordance with a printer model.

According to an embodiment of the present invention, it is possible to bring a print setting closer to a user's desire without imposing a burden on a user when an invalid combination is specified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046157 filed Mar. 9, 2015, which is hereby incorporated by reference herein in its entirety.

What is claimed is:

1. An information processing apparatus comprising:
at least one processor in communication with at least one memory that operate to:
first determine whether an input setting value input via a print setting screen can be set in combination with another setting value;
if the first determination determines that the input setting value cannot be set in combination with the other setting value, secondly determine whether there is a setting value that belongs to a target category and can be set in combination with the other setting value; and
change the input setting value to the setting value that can be set in combination with the other setting value based on a result of determination performed by the first determination and a result of determination performed by the second determination,
wherein the second determination determines whether there is a setting value that belongs to a same category (a first category) as that of the input setting value and can be set in combination with the other setting value, and determines whether there is a setting value that belongs to a second category different from that of the input setting value and can be set in combination with the other setting value if the second determination determines that there is no setting value that belongs to the first category and can be set in combination with the other setting value.

2. The information processing apparatus according to claim 1, wherein, if the second determination determines that there is the setting value that belongs to the target category and can be set in combination with the other setting value, the change changes the input setting value to the setting value that belongs to the target category and can be set in combination with the other setting value.

3. The information processing apparatus according to claim 1,
wherein the first determination determines whether the input setting value can be set in combination with the other setting value based on constraint rule information,
wherein the information processing apparatus further includes a third determination configured to, if the first determination determines that the input setting value cannot be set in combination with the other setting value based on the constraint rule information, determine whether a function corresponding to the input setting value has the lowest priority among functions included in combinations written in the constraint rule information, and
wherein, if the third determination determines that the function corresponding to the input setting value has the lowest priority, the second determination determines whether there is the setting value that belongs to the target category and can be set in combination with the other setting value.

4. A control method comprising:
first determining whether an input setting value input via a print setting screen can be set in combination with another setting value;
second determining whether there is a setting value that belongs to a target category and can be set in combination with the other setting value if the first determining determines that the input setting value cannot be set in combination with the other setting value; and
changing the input setting value to the setting value that can be set in combination with the other setting value based on a result of determination in the first determining and a result of determination in the second determining,
wherein the second determining determines whether there is a setting value that belongs to a same category (a first category) as that of the input setting value and can be set in combination with the other setting value, and determines whether there is a setting value that belongs to a second category different from that of the input setting value and can be set in combination with the other setting value if the second determining determines that there is no setting value that belongs to the first category and can be set in combination with the other setting value.

5. The control method according to claim 4, wherein, if the second determining determines that there is the setting value that belongs to the target category and can be set in combination with the other setting value, the changing changes the input setting value to the setting value that belongs to the target category and can be set in combination with the other setting value.

6. The control method according to claim 4,
wherein the first determining determines whether the input setting value can be set in combination with the other setting value based on constraint rule information,
wherein the control method further includes third determining whether a function corresponding to the input setting value has the lowest priority among functions included in combinations written in the constraint rule information if the first determining determines that the input setting value cannot be set in combination with the other setting value based on the constraint rule information, and wherein, if the third determining determines that the function corresponding to the input setting value has the lowest priority, the second determining determines whether there is the setting value that belongs to the target category and can be set in combination with the other setting value.

7. A non-transitory computer readable medium storing computer executable instructions causing a computer to execute a control method, the control method comprising:

first determining whether an input setting value input via a print setting screen can be set in combination with another setting value;

second determining whether there is a setting value that belongs to a target category and can be set in combination with the other setting value if the first determining determines that the input setting value cannot be set in combination with the other setting value; and changing the input setting value to the setting value that can be set in combination with the other setting value based on a result of determination in the first determining and a result of determination in the second determining, wherein the second determining determines whether there is a setting value that belongs to a same category (a first category) as that of the input setting value and can be set in combination with the other setting value, and determines whether there is a setting value that belongs to a second category different from that of the input setting value and can be set in combination with the other setting value if the second determining determines that there is no setting value that belongs to the first category and can be set in combination with the other setting value.

\* \* \* \* \*